United States Patent

[11] 3,587,816

[72] Inventors Edward J. Russell
Gladwin;
Gaylord W. Brown, Beaverton; Gary A. Adams, Coleman; Dennis J. Dorman, Coleman, Mich.
[21] Appl. No. 729,056
[22] Filed May 14, 1968
[45] Patented June 28, 1971
[73] Assignee Brown Machine Company of Michigan, Inc.
Beaverton, Mich.

[54] MECHANISM FOR REMOVING CONTAINERS FROM MANDRELS
24 Claims, 10 Drawing Figs.

[52] U.S. Cl. .................................................. 198/20, 214/1
[51] Int. Cl. .................................................. B65g 47/04
[50] Field of Search .......................................... 198/20, 232; 214/1 (B1), 1 (BS), 1 (BS)2, 1 (BS)4

[56] References Cited
UNITED STATES PATENTS
| | | | |
|---|---|---|---|
| 2,611,493 | 9/1952 | Nordquist | 198/20X |
| 2,802,563 | 8/1957 | Prendergast | 198/232 |
| 2,904,192 | 9/1959 | Reynolds | 214/1(BS4) |
| 3,363,779 | 1/1968 | Matsushima | 214/1(BS2) |

Primary Examiner—Edward A. Sroka
Attorney—Learman and McCulloch

ABSTRACT: Positively operating suction cup mechanism for removing plastic containers from turret-mounted printing-machine mandrels or the like wherein the radially extending mandrels of the turret are indexed between a container-loading station, a container-printing station, and a container-unloading station, wherein endless transfer conveyor means pivotally carrying spaced-apart suction cup assemblies thereon has a run extending toward a mandrel halted at the unloading station and thence endwisely away from the mandrel in a direction axially parallel with the mandrel to withdraw a container from the mandrel, cam track means is provided adjacent the unloading station which is engaged by a single follower on each suction cup assembly and swings a suction cup endwisely in toward the end of a container on the mandrel as the suction cup assembly is bodily moving away from the mandrel to engage the suction cup with the end of a container on the mandrel and thence, when the container has been withdrawn endwisely off the mandrel, swings the removed container to a vertical position for discharge, and wherein a sensor interrupts movement of the turret means if a container remains inadvertently on the mandrel when the mandrel leaves the unloading station.

INVENTORS
EDWARD J. RUSSELL
GAYLORD W. BROWN
GARY A. ADAMS
DENNIS J. DORMAN

BY *Learman & McCulloch*

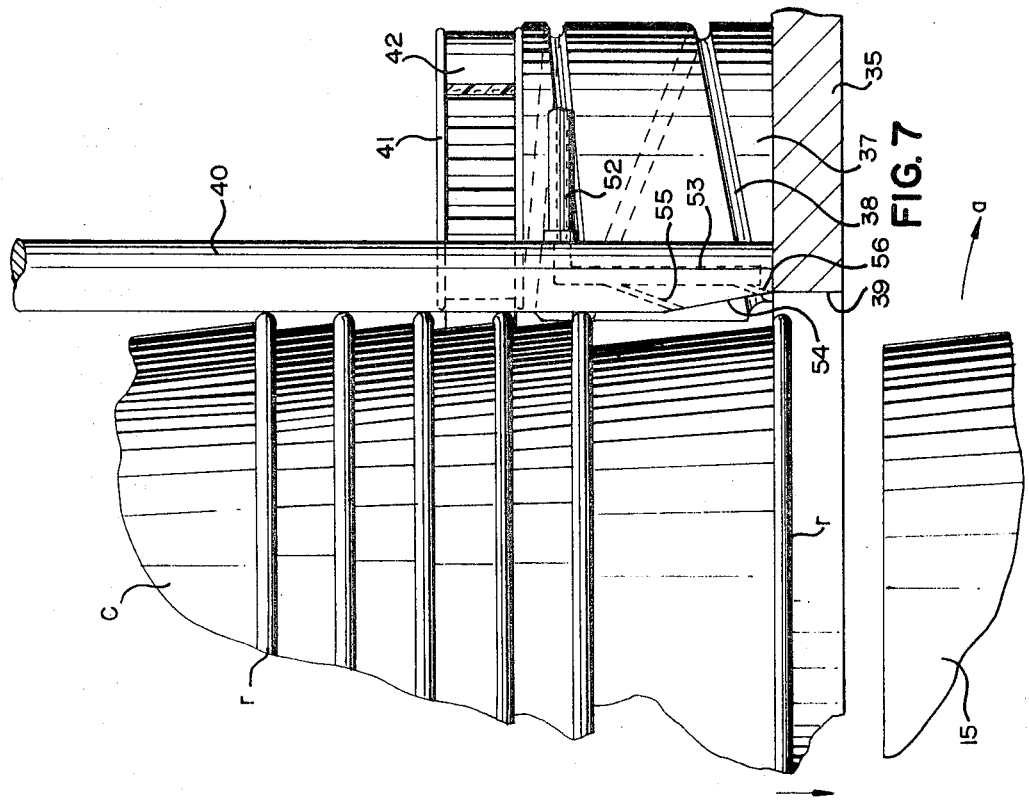
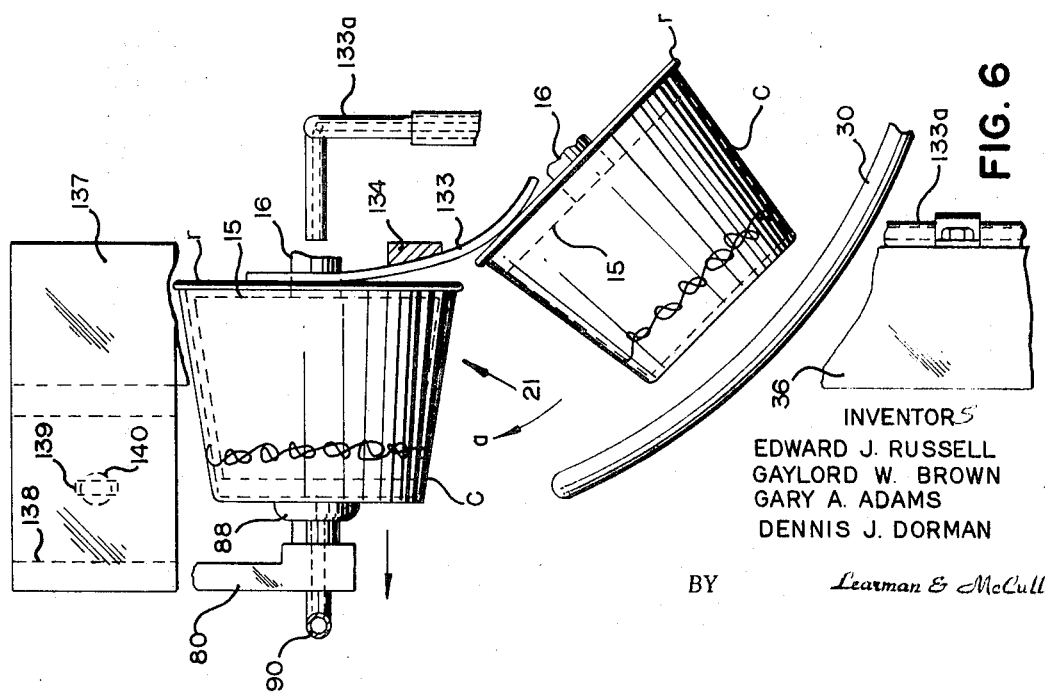

INVENTORS
EDWARD J. RUSSELL
GAYLORD W. BROWN
GARY A. ADAMS
DENNIS J. DORMAN

BY *Learman & McCulloch*

MECHANISM FOR REMOVING CONTAINERS FROM MANDRELS

One of the prime objects of the present invention is to provide positively operating suction cup mechanism which is movable in a substantially linear path endwisely away from mandrels temporarily halted at an unloading station and is operable in a continuous manner to remove containers, which have been printed and are successively presented to the unloading station, to a discharge conveyor.

A further object of the invention is to design suction cup removal mechanism of the character described which is mounted for travel in an endless path and includes a cam follower operated by a cam track at the unloading station for swinging the suction cup in to engage the container and later, after the container has been withdrawn endwisely off a mandrel at the unloading station, for swinging the container to a vertical position in which it is deposited on a discharge conveyor.

Still another object of the invention is to provide removal mechanism of the character described wherein vacuum control valve means moving with the suction cup mechanism is provided for communicating a vacuum source with the suction cup mechanism during a portion of the travel of the suction cup mechanism and operates to also abruptly break the vacuum condition created to release the container from the suction cup assembly at a time when it is desired to deposit the container on a discharge conveyor.

Still another object of the invention is to provide sensing means for indicating whether a container has for some reason inadvertently not been removed from a mandrel leaving the unloading station, and thence for shutting down the machine until the container is removed.

Other objects and advantages of the invention will be pointed out specifically or will become apparent from the following description when it is considered in conjunction with the appended claims and the accompanying drawings, in which:

FIG. 6 is an enlarged, fragmentary, side elevational view illustrating the manner in which stripper members assist in removing the containers initially from the mandrels;

FIG. 7 is an enlarged, fragmentary, sectional side elevational view taken on the line 7-7 of FIG. 5;

Figure 2:
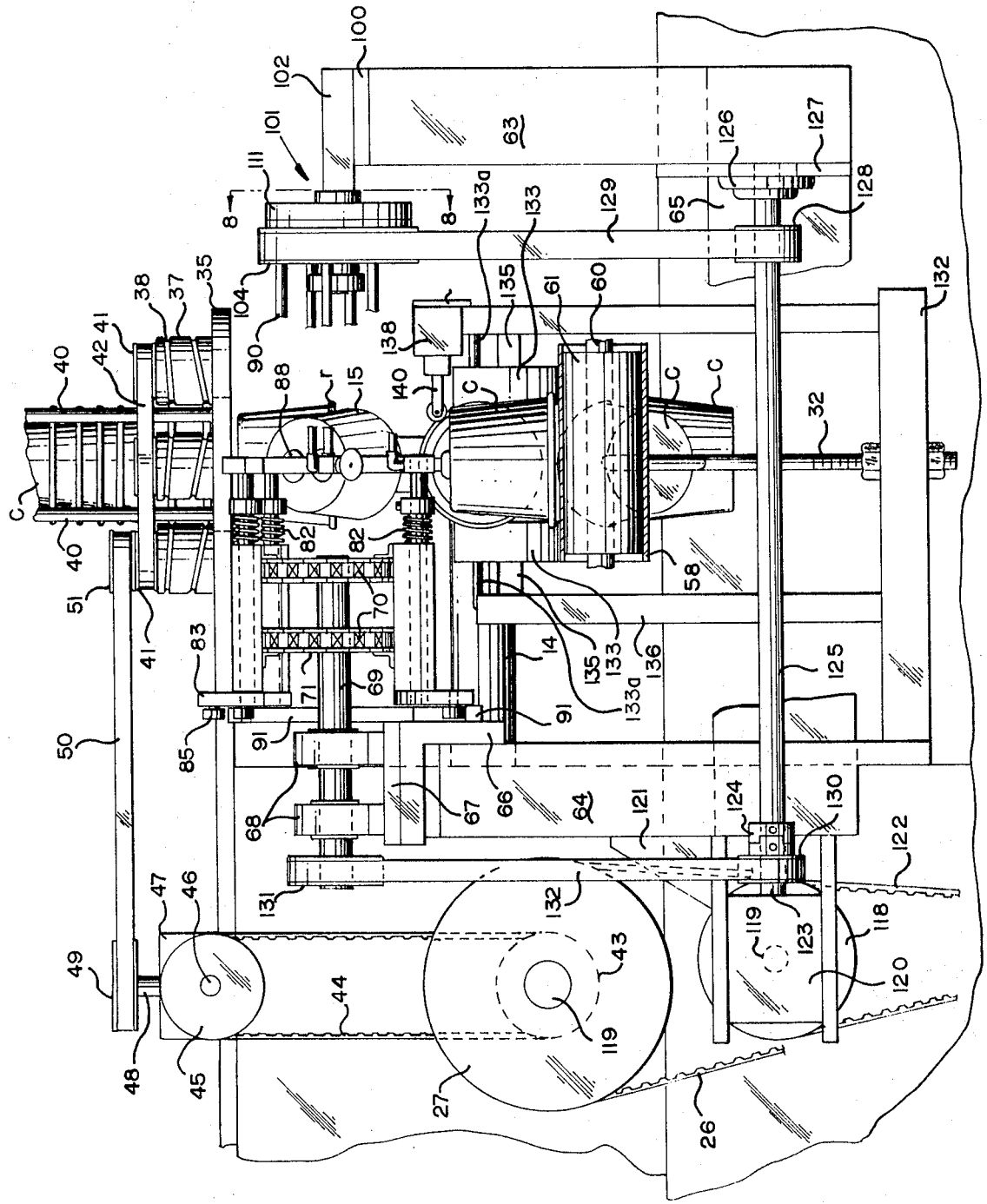
FIG. 2 is a left end elevational view thereof, taken on the line 2-2 of FIG. 1.
Figure 10:
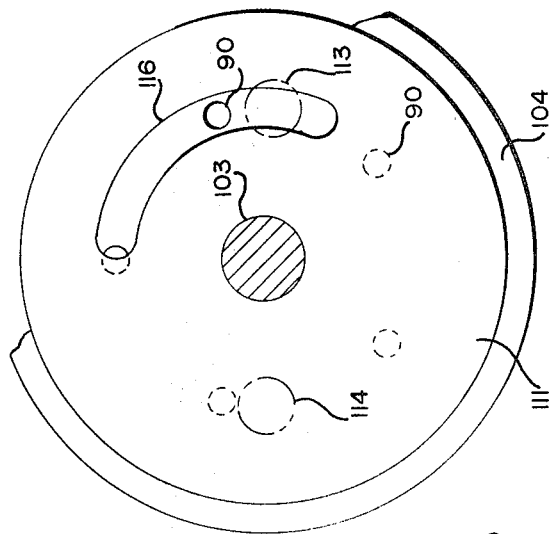
Figure 9:
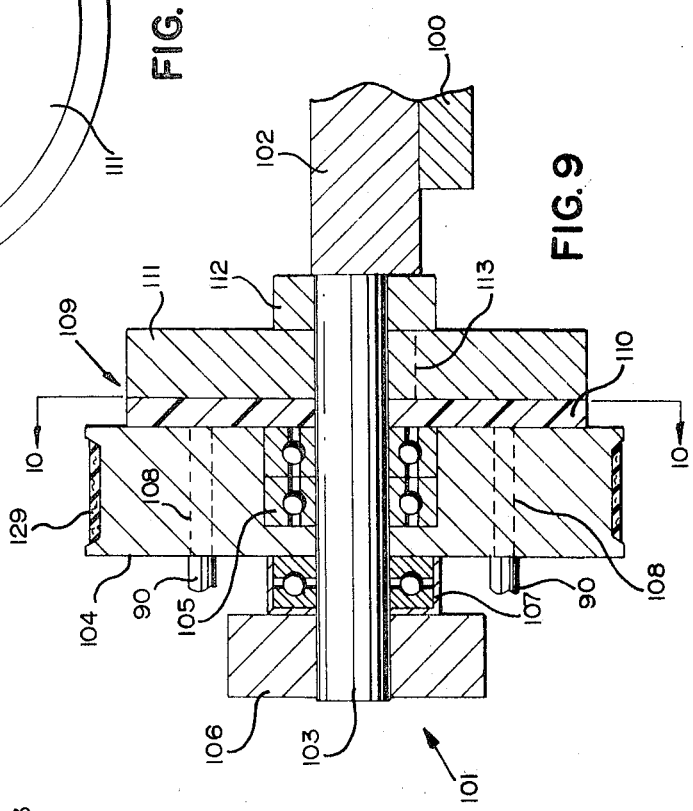
Figure 8:
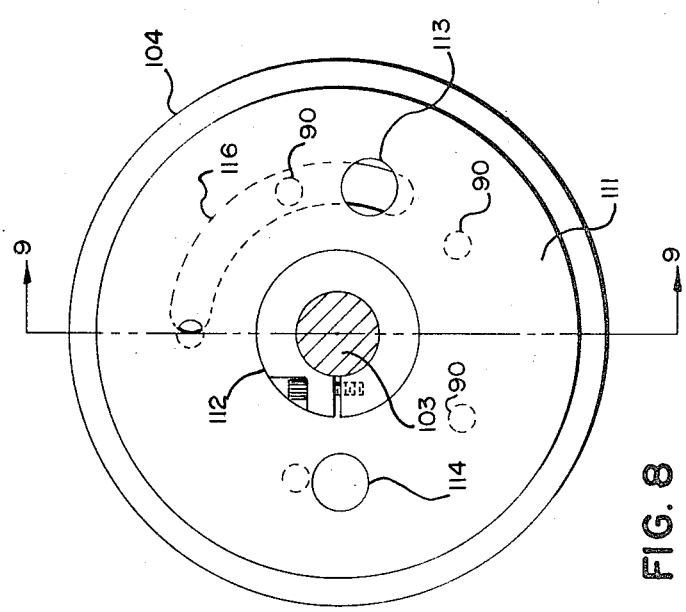

FIG. 8 is an enlarged fragmentary side elevational view taken on the line 8-8 of FIG. 2 and illustrating the vacuum and air control valve assembly; and FIG. 9 is a sectional elevational view taken on the line 9-9 of FIG 8; and FIG. 10 is a sectional elevational view taken on the line 10-10 of FIG. 8.

Figure 5:
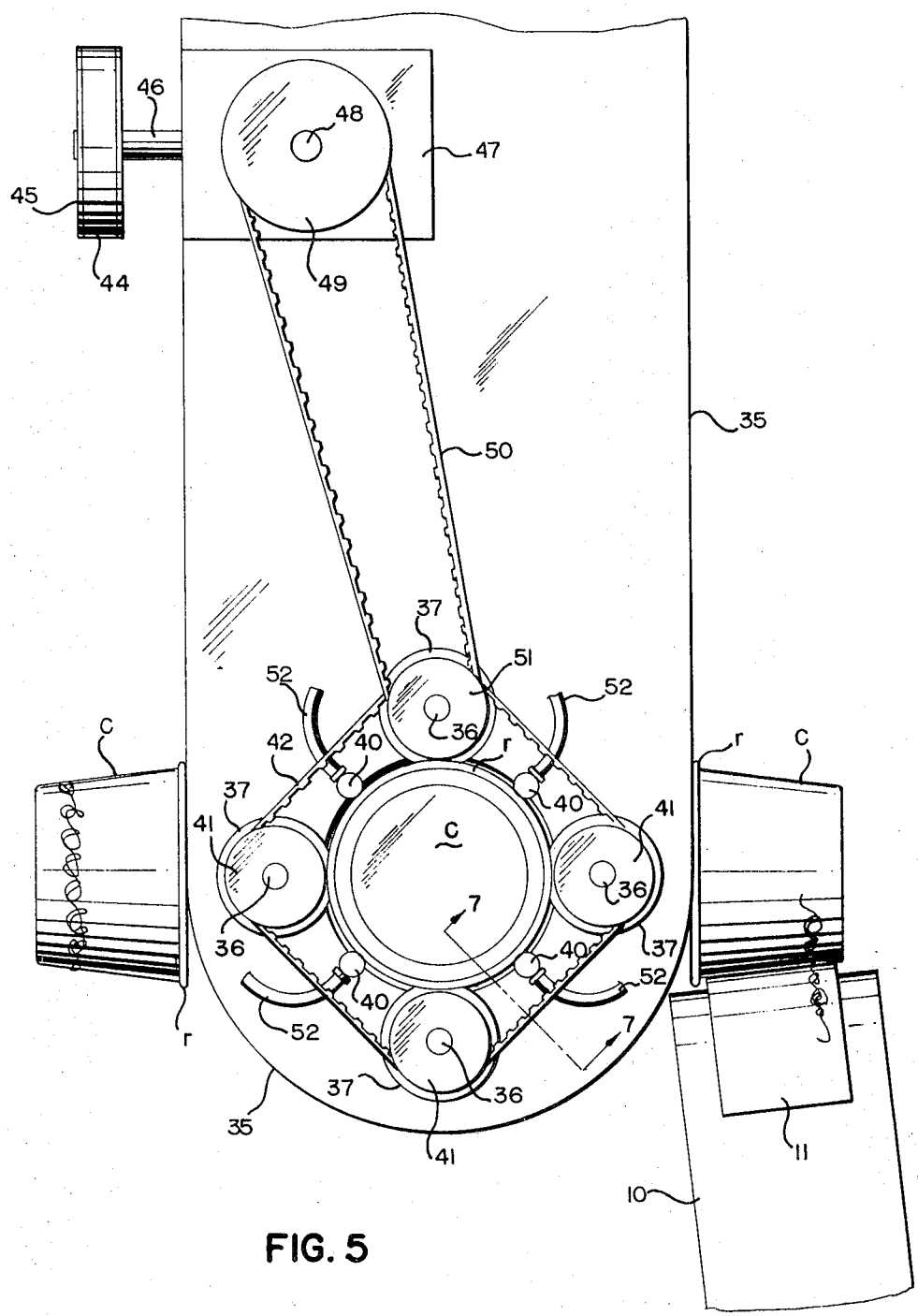
FIG. 5 is an enlarged, fragmentary, top plan view of certain elements of the machine taken on the line 5-5 of FIG. 1.

Referring now more particularly to the accompanying drawings, wherein we have shown a preferred embodiment of the invention only, the letter F generally refers to the frame of a printing or decorating machine with which the removing mechanism is incorporated. It is to be understood that the takeoff mechanism to be described is employed with high-speed printing or decorating machines of the character disclosed in the John C. Hovekamp and Edward J. Russell, Jr., U.S. Pat. No. 3,195,451, issued July 20, 1965, or other machines of this general character. In such machines indexing turrets are usually employed for moving containers on mandrels to a rotating printing drum on which a plurality of circumferentially spaced offset printing mechanisms, including printing blankets, are mounted. The disclosure of the aforementioned patent is incorporated herein by reference and it will not be necessary to describe the printing drum assembly in detail. In FIG. 5 the printing drum 10 is shown with the circumferentially spaced-apart, image-transferring blankets 11 thereon and it is to be understood that the printing drum may be of exactly the construction illustrated in the aforementioned patent.

Figure 1:
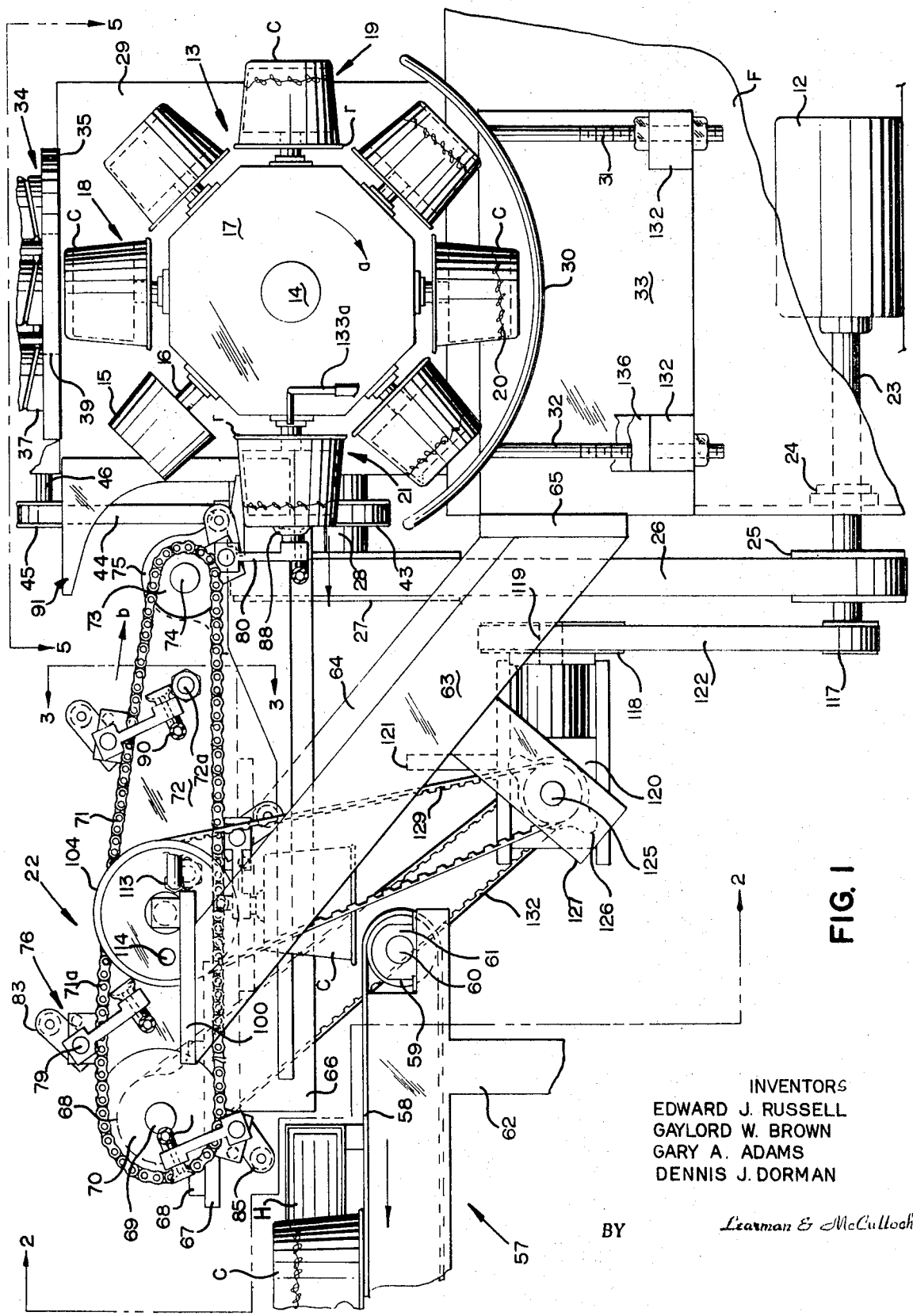
FIG. 1 is a side elevational view of our container-removing mechanism.

The printing drum 10 is continuously driven by a motor 12 in a conventional manner which need not be disclosed herein and it is to be understood that the motor 12 also drives the turret assembly generally designated 13, which is mounted for rotation with a turret shaft 14, through a suitable geneva or like mechanism so that a particular mandrel 15 is intermittently moved through 45° arcs of revolution with periods of dwell between indexing movements. The containers C to be printed are loaded to the container-supporting mandrels 15, which are rotatably mounted on mandrel shafts 16 projecting radially from the octagonal turret 17, at a 12 o'clock position designated 18. As each container C carried by the turret assembly rotates clockwise in FIG. 1 in the direction of arrow *a*, it engages the printing drum 10 at the 3 o'clock position designated 19 and encounters the image-transferring blanket 11 which prints the decorative material 20 on the container C.

From the printing station 19 the containers C are incrementally revolved to a removal or takeoff station 21 where the takeoff mechanism generally designated 22, which will be later more particularly described, is employed for removing the containers C from the mandrels 15 as they are successively presented. The motor 12 is provided with an output shaft 23 journaled by a bearing 24 provided on frame F and mounts a drive pulley 25, as shown, around which a belt 26 is trained. The belt 26 is also trained around a pulley 27 mounted on the input shaft 28 of a geneva drive mechanism 29 and so drives the turret shaft 14, which is the output shaft of the drive box 29, in timed relation with the rotation of the printing drum 10. An arcuate guide member 30 supported on threaded posts 31, which are adjustable vertically, is supported by arms 32 extending from a support plate 33 fixed to the frame F.

Provided above the loading station 18 to supply containers C individually to the mandrels 15 is a container loading assembly generally designated 34 (see FIGS. 2 and 5). The loading mechanism 34 is similar to that shown in the U.S. Hovekamp and Russell Pat. mentioned previously and comprises a support plate 35 journaling a plurality of rotatable shafts 36 on which spirally grooved container-feeding rollers 37 are provided, the rollers 37 having container-denesting grooves 38 adapted to accommodate the rims *r* formed on the containers C and guide them individually to a loading opening 39 provided in the plate 35. The containers C are supplied to guide rods 40 extending upwardly from the plate 35 circumferentially between the rollers 37 by a pneumatic tube or in other ways well known to the art so that a stack of containers C forms within the rods 40. The function of rollers 37, then, is to separate the lowermost container C and feed it individually to a mandrel 15 presented to receive it. Accordingly, the rolls 37 must be revolved in timed relation with the rotation of shaft 14 so that a container C will be in position to be received on each mandrel 15 successively presented at the loading station 18.

Mounted on each shaft 36 is a timing pulley 41 and it will be observed that the toothed pulleys 41 are connected for rotation in unison by a toothed timing-belt member 42. It is the motor 12 which also drives the timing belt 42 through a pulley 43 mounted on the shaft 28 (see FIG. 1), there being a drive belt 44 trained around the pulley 43 and around a pulley 45 provided on an input shaft 46 extending from a gear box 47. The output shaft 48 of the gear box 47 mounts a pulley 49 which has a belt 50 also trained around a pulley 51 mounted on one of the shafts 36.

To assist the forces of gravity to vertically move a container C released by the rollers 37, air under a pressure of about 80 p.s.i. is supplied to each of the guide rods 40 from a suitable source of air under pressure by lines 52 (see FIG. 7) which lead to a vertical air passage 53 provided in each rod 40. It will be observed that each of the guide rods 40 is ground away as at 54 at its lower end to provide clearance for the rims *r* of the containers as they descend in the grooves 38. A pair of spaced-apart ports 55 and 56 are provided connecting each surface 54 with the port 53 and operate to deliver air under pressure in streams against the underside of each rim *r*. The air delivered through passages 55 assists the rollers 37 in feeding the containers C downwardly and the air delivered in jets from ports 56 moves the containers quickly to the mandrels 15 and permits the high-speed operation of the machine.

THE CONTAINER REMOVING MECHANISM

The container-removing mechanism 22 is provided for moving containers C endwisely off a mandrel 15 during the periods of dwell of turret 17 and thence revolving them 90° and depositing them on a discharge conveyor generally designated 57. The conveyor 57 is preferably an endless conveyor or carrier which includes a takeaway belt 58, trained around rollers 59 at both ends and mounted on shafts 60 which are journaled by bearings 61 supported by conveyor side frame members 62. The takeaway assembly 22 is supported by the frame F on a pair of inclined beams 63 and 64 which are welded to a cross beam 65 provided on frame F. Mounted on the one inclined beam 64 is an angle support member 66 on which a support plate 67 is provided for mounting a pair of bearings 68 which journal a drive shaft 69 for the takeaway mechanism 22. Mounted on the shaft 69 are a pair of sprockets 70 around which chains 71 are trained and it will be seen that the chains 71 extend along a pair of chain guide members 72 which may be fabricated of nylon or another suitable material and are supported from plate 66 on threaded rods 72*a*. At their front ends the chains 71 are trained around sprockets 73 mounted on an idler shaft 74, shaft 74 being similarly journaled in bearings 75 supported on plate 66. The sprockets 70 are of somewhat greater diameter than the sprockets 73, so that the upper run portions 71*a* of the chains 71 are inclined downwardly in their direction of travel *b*. The lower runs 71*b* of the chains 71 extend parallelly with the discharge conveyor member 58 and with the axis of a mandrel 15 halted at the mandrel unloading station 21.

Figure 3:
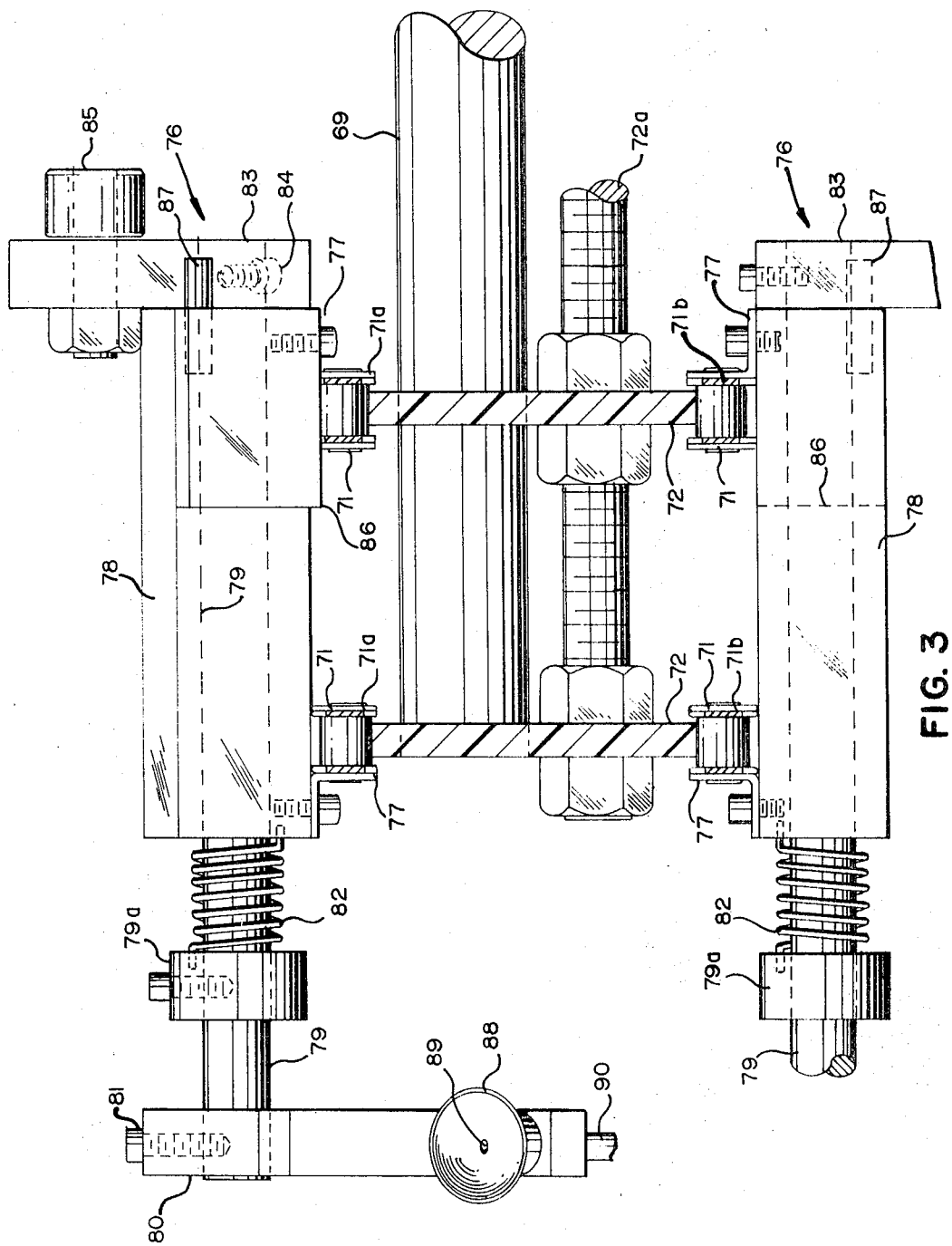
FIG. 3 is a greatly enlarged, transverse sectional view, taken on the line 3-3 of FIG. 1 and particularly illustrating the construction of the container-removing suction cup assemblies.

Mounted at spaced-apart intervals by the pair of chains 71 are a plurality of suction cup assemblies generally designated 76 which are more particularly illustrated in FIG. 3. The chains 71 are preferably conventional roller chains which are provided with special additional angle links or brackets 77 for supporting block members 78 in which pins or shafts 79 are journaled. On one end of each shaft 79 a suction-cup-supporting arm 80 is fixed, as with a setscrew 81, and a torsion spring 82 is connected between a collar 79*a* fixed on each shaft 79 and the block 78 to bias the shaft 79. On the other end of each shaft 79 is fixed a follower arm 83, as with a setscrew 84, each arm 83 carrying a follower roller 85, as shown. On each block 78 a support block 86 is secured which has a stop pin 87 limiting pivotal movement of each shaft 79 under the biasing force of the torsion spring 82. Each suction-cup-supporting arm 80 mounts a soft rubber suction cup 88 in communication with a port 89 through the arm 80 which communicates with a flexible vacuum line 90.

Figure 4:
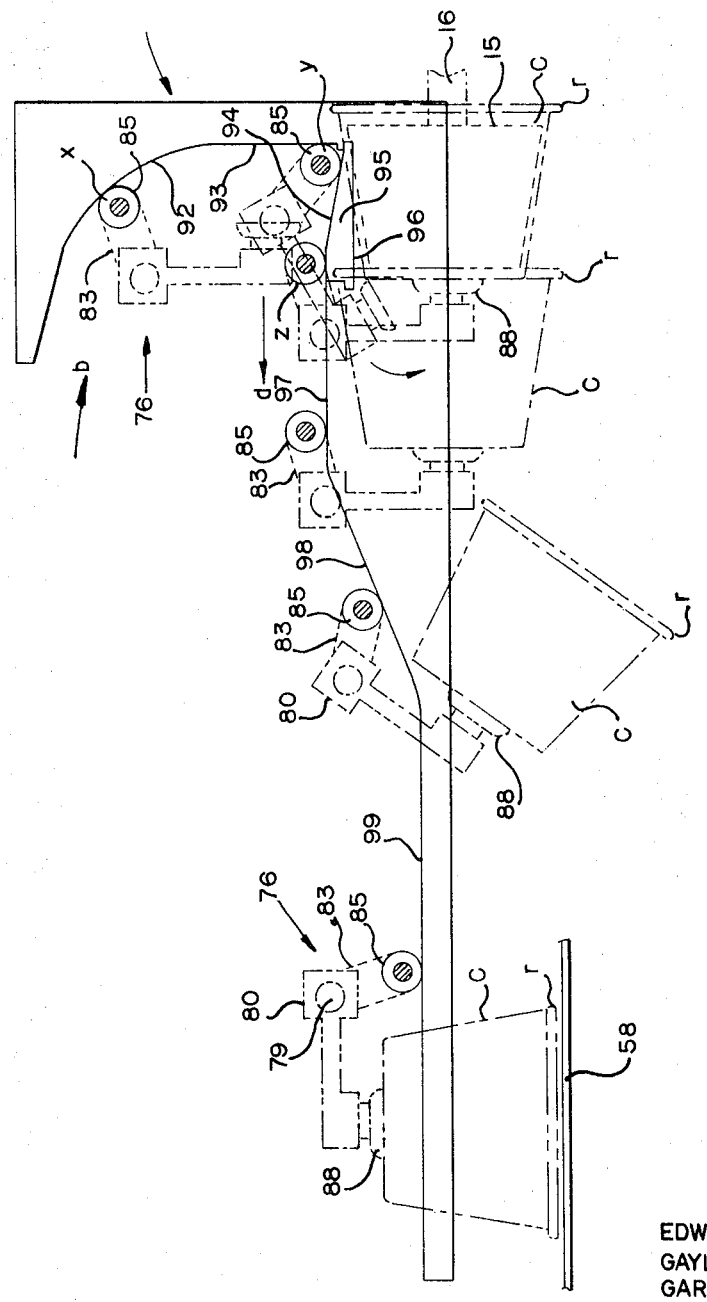
FIG. 4 is an enlarged, schematic side elevational view illustrating various positions of the container-removing suction cup assemblies during the removal operation.

As each suction cup assembly 76 travels forwardly toward the turret assembly 13 in the direction *b*, its follower roller 85 moves into engagement with an angular cam generally designated 91 which, as FIG. 4 shows, includes a curvilinear surface 92, a vertical surface 93, a slightly upwardly and rearwardly inclined surface 94 formed by a resilient pad 95 secured in a recess 96, a horizontal surface 97, a downwardly and rearwardly inclined surface 98, and finally a rearwardly extending, horizontal surface 99. The cam 91 may be fixed to the angle support member 66 in any suitable manner.

It is desired that suction forces be applied to each suction cup 88 during only a portion of its travel during a period when it first engages a container C and continuing until the container C moves over the discharge conveyor 58. Mounted on a support plate 100 on support beam 63 is a control valve member generally designated 101 to which each suction hose 90 is connected. As FIGS. 8—10 particularly indicate, a block 102 mounted on the support plate 100 supports a stub shaft 103 on which a pulley member 104 is journaled, as with a pair of roller bearing members 105. A locking member 106 provided on the outboard end of stub shaft 103 adjacent a roller bearing 107 sandwiched between the stationary ring 106 and pulley 104 maintains the pulley 104 in position on the shaft 103, as shown in FIG. 8. Each suction hose 90 is connected with a passage 108 extending in an axially parallel direction through the pulley 104 and, inasmuch as the pulley 104 revolves in timed relation with the travel of each suction cup assembly 76, the hoses 90 do not become twisted. Mounted axially opposite the pulley 104 is a suction force control assembly generally designated 109 which includes ring members 110 and 111 secured to shaft 103 by a locking collar 112. It is to be understood that each of the members 110 and 111 are fixed to shaft 103 and do not rotate with the pulley 104. Provided in the plate 111 is a vacuum-applying opening 113 and a vacuum-breaking opening 114, a vacuum hose 115 communicating the opening 113 with a suitable vacuum-creating device such as a suction pump, whereas the opening 114 is open through the plate 111 to atmosphere. An elongate slot 116 is provided in the member 110 which communicates with the vacuum opening 113 in plate 111. As the pulley 104 is revolved, each of the openings 108 is, of course, for a time in communication with the vacuum slot 116. When the particular suction cup assembly 76 has traveled around to a position in which the container C which it carries is over the conveyor belt 58, the particular vacuum hose 90 connecting with its suction cup 88 is opposite the air hole 114, which breaks the vacuum and causes the container C to drop from the suction cup 88 down to the conveyor belt 58. Heaters H, which may be of the electric radiant heat type, are arranged adjacent discharge conveyor 58 to dry the printing matter 20 thereon as the containers C move away on the conveyor 58.

The motor shaft 23 is also employed to drive both the shaft 69 and the pulley 104. A pulley 117 mounted on the shaft 23 is employed to drive the pulley 118 on the input shaft 119 of a gear box 120, which is supported from the beam 64 by a bracket 121, by means of a belt 122. As FIG. 2 particularly indicates, the gear box 120 has an output shaft 123, coupled as at 124 to a shaft 125 which is supported at its opposite end by a bearing 126 provided on a support plate 127 on the beam 63. A pulley 128 on the shaft 125 is trained around the pulley 104 and drives the pulley 104 via a belt 129. Also, a pulley 130 mounted on the shaft 123 drives a pulley 131 fixed to the takeaway conveyor drive shaft 69 via a belt 132.

To assist the suction cups 88 in removing the containers C from mandrels 15, regardless of how tight a fit a particular container C is, an arcuate stripper member 133 and stationary air jet tubes 133*a* are employed, as shown particularly in FIG. 6. The stripper member 133 is carried on a plate 134 extending from an arm 135 which is supported by a post 136 extending vertically from one support 132. As FIG. 6 indicates, the function of arcuate member 133 is to cam the rim *r* of a container C axially outwardly so that the container C is positively moved outwardly a certain distance on the mandrel 15, and also to function as a brace preventing inward telescoping movement of the container C at the time the container C is engaged by a suction cup 88. While only one stripper member 133 is shown in FIG. 6, it is to be understood that a pair of members 133 are provided oppositely disposed to move the container C uniformly outwardly of its mandrel 15. Also mounted on the support post 136 is a bracket 137 which supports a limit switch 138. The limit switch 138 mounts a roller 139 on a depressible stem 140 which opens switch 138 when depressed. If, for some reason, a container C is not removed by a suction cup 88 after it has been initially moved outwardly on its mandrel 15 by the strippers 133, the container C remaining contacts roller 139 to depress the stem 140 and opens switch 138. Since switch 138 is in series with motor 12, the motor 12 is immediately stopped and double loading of any mandrel 15 is avoided.

THE OPERATION

In operation the mandrels 15 are loaded at the loading station 18 in the manner previously described and then printed at the printing station 19 prior to moving on to the unloading station 21. As in the Hovekamp et al. patent mentioned previously, the turret 17 advances in indexing movements and there is a short period of dwell or hesitation at each station. As a particular mandrel 15 approaches unloading station 21, the suction cup assembly 76 which will unload it has its roller 85 in engagement with the curvilinear surface 92 of the cam 91, the particular torsion spring 81 being biased in a direction to urge the roller 85 outwardly against the cam 91 throughout the travel of the suction cup assembly 76 along the various cam surfaces of cam 91. As the particular suction cup assembly 76 travels down the cam surface 93, it is in substantially the position shown at $x$ in FIG. 4 and, as it continues to travel, is maintained in a position in which it clears a container C halted at the unloading station 21. When the roller 85 abruptly meets the cushion pad 95 (position $y$), the roller 85 is prevented from traveling further downwardly and moves upwardly along ramp surface 94 so that the suction cup is swung downwardly to engage the end wall of the container C stopped at the unloading position. Finally, when the roller 85 reaches the position $z$, movement of the chains 71 has completely swung the arms 83 and 80 counterclockwisely in a direction to cause the suction cup 88 to engage the bottom of a container C at the unloading station in the direction indicated by the arrow $d$. The ramp 94 is responsible, together with the chains 71, for swinging the cup 88 sharply down to engage the bottom of a container C to exert an endwise push on it. At this time the suction slot 116 is communicating with the particular hose 90 servicing the particular suction cup assembly 76 and, with further movement of the suction cup assembly 76 rearwardly, the container C is drawn endwisely off the mandrel 15. By the time the follower roller 85 reaches the inclined surface 98, the container C has been drawn completely off the mandrel 15 and the roller 85 then travels downwardly on the inclined surface 98, which permits the torsion spring 82 to pivot the suction assembly 76 and container C through a 90° angle to a position in which its rim $r$ is parallel with the conveyor belt 58. The suction cup assembly 76 and container C remain in this position as the follower roller travels along cam surface 99. Until the container being unloaded reaches a predetermined position above the discharge conveyor belt 58, suction forces are applied to carry it along to a position above the belt 58. When a predesignated position is reached, the particular vacuum hose 90 for the suction cup assembly 76 carrying the container C communicates with the vacuum-breaking passage 114 and the container C is abruptly dropped to the surface of the conveyor belt 58.

The diametrically opposite air tubes 133$a$, which are connected to a suitable source of air under pressure, are provided on each side of the unloading station in straddling relation with a mandrel moved to the station and direct jets of air under a pressure which typically may be 80 p.s.i. at the rim $r$ of the container being unloaded to force the container outwardly against a suction cup 88. If for some reason the timing of the machine has been disrupted and no suction cup 88 has reached the unloading station, the air jets blow the container C off the mandrel. The switch 138 operates when, despite the air jets, a container remains on the mandrel and the machine must be stopped to force it off.

It is to be understood that the drawings and descriptive matter are in all cases to be interpreted as merely illustrative of the principles of the invention, rather than as limiting the same in any way, since it is contemplated that various changes may be made in the various elements to achieve like results without departing from the spirit of the invention or the scope of the appended claims.

We claim:

1. Mechanism for removing container parts comprising: support means for a container part; transfer conveyor means movable in a path of travel endwisely away from said support means and a container part thereon; gripping means being mounted on said conveyor means for relative movement with the conveyor means from one position to another in which it moves endwisely toward and into engagement with a container part on said support means; and means for moving said gripping means into container part engaging position while said conveyor means is traveling endwisely away from the support means and container part thereon; said transfer conveyor means moving said gripping means away from said support means in a substantially linear path of travel generally endwisely aligned with the container part and support means to remove a container part endwisely and transfer it to a remote location.

2. Mechanism as set forth in claim 1 wherein said gripping means comprises a pivotal shaft carried by said transfer conveyor means and having a follower extending from one end thereof and an arm extending from the other end thereof mounting a gripping mechanism; and cam track means engageable by said follower for pivoting said shaft to swing the gripper mechanism endwisely in toward the container part to engage the container part on the support means.

3. Mechanism for removing containers axially from printing machine mandrels and the like along the axes thereof comprising: mandrel mounting means, having a mandrel over which a container is telescopically received, movable to a container-unloading station and holding it temporarily there; endless conveyor member mechanism having an end run adjacent the unloading station and a longitudinal run portion extending generally parallel with the axis of the mandrel in a direction away from the mandrel; and suction cup means movable with said endless conveyor member mechanism toward and thence endwisely away from a mandrel at the unloading station in a substantially linear direction generally aligned with the axis of the mandrel for removing a container endwisely off the mandrel while the mandrel is at the unloading station.

4. The combination defined in claim 3 in which said suction cup means comprises a pivotal shaft carried by said endless member mechanism and having a follower extending therefrom; arm means projecting from said shaft and carrying a suction cup; and in which cam track means is provided at said unloading station which is engaged by said follower to pivot said shaft.

5. The combination defined in claim 4 in which said cam track means includes a shaft-actuating section extending generally parallel to said longitudinal run portion of the conveyor mechanism but angularly thereto so that said shaft is caused to pivot the suction cup into engagement with the end wall of a container on the mandrel as the suction cup means is moving outwardly on said longitudinal run portion of the conveyor member mechanism.

6. The combination defined in claim 5 in which said cam track means includes a vertical section leading to said section, and said shaft-actuating section is formed at least in part of a resilient pad.

7. The combination defined in claim 5 in which said cam track means includes a section leading outwardly from said angularly extending shaft-actuating section which is parallel with the axis of the mandrel to permit the suction cup to move the container endwisely off the mandrel.

8. The combination defined in claim 7 in which said cam track means includes a second shaft-actuating section angularly disposed relative to said longitudinal run portion of the conveyor mechanism for pivoting said shaft sufficiently to dispose the container carried by the suction cup in vertical position after it has been withdrawn from the mandrel.

9. Mechanism as set forth in claim 3 including sensing means in the path of a container which remains on a mandrel downstream of the unloading station, for interrupting movement of the mandrel mounting means if a container is inadvertently not removed.

10. The combination defined in claim 3 in which a plurality of suction cup means are mounted on said endless conveyor mechanism; a rotary valve mechanism which communicates with stationary vacuum communicating means is supported for movement with said endless conveyor mechanism; and a separate flexible hose member connects said rotary valve mechanism with each suction cup means.

11. Mechanism for removing containers axially from printing machine mandrels and the like along the axes thereof comprising: mandrel mounting means, having a mandrel over which a container with an end wall is telescopically received, movable to a container-unloading station and holding it temporarily there in a generally horizontal position; suction cup means movable toward and thence endwisely away from a mandrel at the unloading station in a substantially linear direction generally aligned with the axis of the mandrel for removing a container endwisely off the mandrel while the mandrel is at the unloading station; said suction cup means including a carrier mounted for movement toward and away from a mandrel at the unloading station, and a suction cup mechanism on the carrier which is movable to various positions thereon; and cam means at the unloading station for moving the suction cup mechanism relative to the carrier from a position in which it is generally parallel with and engages the end wall of a container on the mandrel to a position in which the container has been moved to a vertical position in which the container has been moved to a vertical position for discharge.

12. Mechanism for axially removing containers from printing machine mandrels and the like along the axes thereof comprising: mandrel mounting means, having a mandrel over which a container with an end wall is telescopically received, movable to a container-unloading station and holding it temporarily there; suction cup means movable toward and thence endwisely away from a mandrel at the unloading station in a substantially linear direction generally aligned with the axis of the mandrel for removing a container endwisely off the mandrel while the mandrel is at the unloading station; said suction cup means including a carrier mounted for movement toward and away from a mandrel at the unloading station and a suction cup mechanism on the carrier which is movable to various positions thereon; and cam means at the unloading station for moving the suction cup mechanism relative to the carrier from one position remote from the end wall of a container on the mandrel in a generally axial direction in toward and into engagement with the end wall of a container on the mandrel.

13. The combination defined in claim 12 in which means disposed in the path of a container on a mandrel engages the rim of the container on the mandrel at the loading station and prevents said suction cup from moving the container further inwardly on the mandrel.

14. Mechanism for handling container parts comprising: support means for supporting container parts; endless conveyor member mechanism having an end run adjacent the support means and a longitudinal run portion extending generally parallel with the axis of the container part and movable in a direction away from the container part; gripping means swingably mounted on said mechanism; and means for swinging said gripping means toward and into general alignment with the axis of a container part on said support means; said longitudinal run portion moving said gripping means away from said support means in a substantially linear direction generally aligned with the axis of the container part to remove a container part endwisely and transfer it to a remote location.

15. Mechanism for positively removing containers from printing machine mandrels and the like comprising: rotating indexing turret means, having radially extending mandrels over which the containers are telescopically received, movable with the turret means following periods of dwell in increments between a container-loading station, a container-printing station, and a container-unloading station; discharge conveyor means for receiving containers removed from the mandrels; stripper means in the path of a container on a mandrel being moved to the unloading station for initiating outward movement of the container thereon; transfer conveyor means pivotally carrying spaced-apart suction cup assemblies thereon in a path down toward and thence endwisely away from a mandrel at the unloading station for removing a container endwisely off the mandrel during a period of dwell; a suction cup pivotally mounted by each suction cup assembly; cam track means engageable by each suction cup assembly for swinging the suction cup thereon endwisely in toward the end of a container on the mandrel halted at the unloading station as the assembly is bodily moving endwisely away from the mandrel to engage the suction cup with the container on the mandrel and thence, when the container has been withdrawn horizontally off the mandrel, swinging the removed container to a vertical position for discharge to the discharge conveyor means; and sensing means in the path of a container on a mandrel downstream of the unloading station for interrupting movement of the turret means and transfer conveyor means if a container is inadvertently not removed.

16. Mechanism for removing container parts comprising: support means for container parts; gripping means movable toward and thence endwisely away from a container part on said support means in a substantially linear direction generally aligned with the axis of the container part for removing a container part endwisely and transferring it to a remote location; said gripping means including a carrier mounted for movement toward and away from a container part on said support means, and a gripping mechanism on the carrier which is movable to various positions thereon; and means for moving the gripping mechanism relative to the carrier from a position in which it is generally parallel with and engages a container part on the support means to a position in which the container part has been moved to a position generally normal to said direction for discharge.

17. Mechanism for removing container parts comprising: support means for a container part; gripping means movable toward and thence endwisely away from a container part thereon in a substantially linear direction generally aligned with the axis of the container part for removing the container part endwisely and transferring it to a remote location; said gripping means including a carrier mounted for movement axially toward and away from a container part on said support means, and a gripping mechanism on the carrier which is movable to various positions thereon; and means for moving the gripping mechanism relative to the carrier from one position remote from the container part on the support means in a generally axial direction in toward and into engagement with the container part on the support means.

18. Mechanism for positively removing container parts from support means comprising: transfer conveyor means pivotally carrying gripping means thereon in a path down toward and thence endwisely away from a container part for removing a container part endwisely and moving it to a remote location; discharge conveyor means for receiving container parts from said transfer conveyor means; cam track means engageable with said gripping means for swinging the gripping means endwisely in toward a container part on the support means as the gripping means is bodily moving with the transfer conveyor means endwisely away from the container part and support means to grip the container part on the support means so that the gripping means may remove such a container part endwisely and transfer it to a remote location.

19. Mechanism for removing containers from printing machine mandrels and the like comprising: carrier means having projecting mandrels over which the containers are telescopically received movable between a container loading station, a work station, and a container-unloading station; stripper means in the path of a container on a mandrel being moved to the unloading station for initiating outward movement of the container thereon; and transfer means carrying container-engaging means thereon movable in a path endwisely away from a mandrel at the unloading station for removing a container endwisely off the mandrel.

20. The combination defined in claim 19 in which said stripper means comprises a pair of curvate stripper bars extending generally crosswisely of the axis of the mandrel as it arrives at the unloading station and straddling the mandrel; the stripper bars also operating to prevent inward movement of the container on the mandrel at the unloading station.

21. Mechanism for removing containers from printing machine mandrels and the like comprising: carrier means having projecting mandrels over which the containers are telescopically received indexable between a container-loading station, a work station, and a container-unloading station; elongate endless transfer conveyor means having a run extending adjacent the unloading station and carrying spaced-apart suction cup means for engaging the end wall of a container on the mandrel at the unloading station; discharge conveyor means adjacent said transfer conveyor means and to which said containers are delivered; a control valve mechanism having spaced-apart, flexible vacuum hoses connecting with each suction cup means; said valve having a rotating member to which said hoses are connected and a stationary part for selectively communicating the hoses with a vacuum source during the time that a cup engages a container, pulls it endwisely off the mandrel, and moves it to the discharge conveyor; and means for driving the endless transfer conveyor means and rotary valve member in timed relation so that each orbits simultaneously with the other.

22. The combination defined in claim 21 in which said transfer conveyor means has elongate upper and lower runs connected by an end run adjacent said unloading station and another end run; and shaft means rotatably mounting said rotary valve member extends between said upper and lower runs; a stationary disc member having an arcuate vacuum slot and an air opening being fixed on the shaft and constituting said stationary part.

23. Mechanism for removing containers from printing machine mandrels and the like comprising: mandrel mounting means having a mandrel over which a container is telescopically received movable to a container-unloading station and holding it temporarily there; stationary means at said unloading station for directing an air jet at a container on said mandrel; transfer conveyor means having spaced-apart container-gripping members movable toward and thence endwisely away from a mandrel at the unloading station for removing a container endwisely off the mandrel while the mandrel is at the unloading station.

24. The combination defined in claim 20 in which said air-jet-directing means comprises a pair of diametrically opposite air tubes aligned to play air jets at the rim of a container brought between them on the mandrel and assist the gripping members in removing the container.